US010680753B2

(12) United States Patent
Visoz et al.

(10) Patent No.: US 10,680,753 B2
(45) Date of Patent: Jun. 9, 2020

(54) METHOD FOR TRANSMITTING A DIGITAL SIGNAL FOR A SYSTEM HAVING AT LEAST ONE DYNAMIC HALF-DUPLEX RELAY WITH SELECTIVE LOGIC, CORRESPONDING PROGRAM PRODUCT AND RELAY DEVICE

(71) Applicant: ORANGE, Paris (FR)

(72) Inventors: Raphael Visoz, Vanves (FR); Abdulaziz Mohamad, Les Ulis (FR); Antoine Berthet, Chatneay Malabry (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/312,124

(22) PCT Filed: Jun. 22, 2017

(86) PCT No.: PCT/FR2017/051659
§ 371 (c)(1),
(2) Date: Dec. 20, 2018

(87) PCT Pub. No.: WO2017/220937
PCT Pub. Date: Dec. 28, 2017

(65) Prior Publication Data
US 2019/0230526 A1    Jul. 25, 2019

(30) Foreign Application Priority Data
Jun. 23, 2016   (FR) ...................................... 1655886

(51) Int. Cl.
*H04B 7/15* (2006.01)
*H04B 7/155* (2006.01)
(Continued)

(52) U.S. Cl.
CPC .............. *H04L 1/0076* (2013.01); *H04B 7/15* (2013.01); *H04B 7/15521* (2013.01);
(Continued)

(58) Field of Classification Search
CPC .... H04B 7/14–17; H04L 1/0009–0022; H04L 1/004–0077; H04L 2001/0097;
(Continued)

(56) References Cited

U.S. PATENT DOCUMENTS 9,319,187 B2   4/2016 Hatefi et al.
10,027,400 B2  7/2018 Mohamad et al.
(Continued)

FOREIGN PATENT DOCUMENTS

WO   2012022905 A1   2/2012
WO   2015092302 A1   6/2015
(Continued)

OTHER PUBLICATIONS

International Search Report dated Sep. 26, 2017 for corresponding International Application No. PCT/FR2017/051659, filed Jun. 22, 2017.
(Continued)

*Primary Examiner* — Timothy J Weidner
(74) *Attorney, Agent, or Firm* — David D. Brush; Westman, Champlin & Koehler, P.A.

(57) ABSTRACT

A relaying method in a telecommunication system having a plurality of sources, a half-duplex relay and a recipient. The relay performs a receiving phase of: receiving codewords transmitted by the sources, including estimating for each source a message associated with the codewords transmitted by the source, error detection and decision of error-free decoded messages, which determine the set of sources decoded without error by the relay; a phase of coding and transmitting to the recipient a signal uniquely representative
(Continued)

Figure 1:
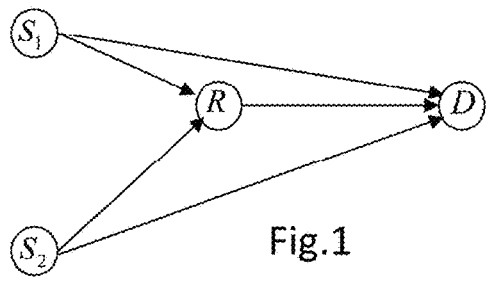

of the selection of messages, such that, after each reception of a block from different sources, the relay receives and decodes a return path from the destination indicating if no or at least one message is decoded without error, these messages determining the set of sources decoded without error. The relay switches from the receiving phase to the coding and transmission phase once a logic rule is valid.

11 Claims, 3 Drawing Sheets

(51) Int. Cl.
  *H04L 1/00* (2006.01)
  *H04L 5/16* (2006.01)
  *H04W 24/02* (2009.01)
  *H04W 28/04* (2009.01)
  *H04W 40/22* (2009.01)
  *H04W 84/04* (2009.01)
  *H04W 88/04* (2009.01)

(52) U.S. Cl.
  CPC ....... *H04B 7/15592* (2013.01); *H04L 1/0019* (2013.01); *H04L 1/0045* (2013.01); *H04L 1/0057* (2013.01); *H04L 1/0061* (2013.01); *H04L 1/0073* (2013.01); *H04L 1/0077* (2013.01); *H04L 5/16* (2013.01); *H04W 24/02* (2013.01); *H04W 28/04* (2013.01); *H04W 40/22* (2013.01); *H04L 2001/0097* (2013.01); *H04W 84/047* (2013.01); *H04W 88/04* (2013.01)

(58) Field of Classification Search
  CPC ........ H04L 5/16; H04W 24/02; H04W 28/04; H04W 40/22; H04W 84/047; H04W 88/04
  See application file for complete search history.

(56) References Cited

U.S. PATENT DOCUMENTS

| | | | |
|---|---|---|---|
| 10,122,496 | B2 | 11/2018 | Mohamad et al. |
| 10,153,864 | B2 | 12/2018 | Mohamad et al. |
| 2018/0367254 | A1* | 12/2018 | Mohamad ............. H04L 1/0076 |
| 2019/0229851 | A1* | 7/2019 | Mohamad ............. H04L 1/0076 |

FOREIGN PATENT DOCUMENTS

| | | |
|---|---|---|
| WO | 2015197990 A1 | 12/2015 |
| WO | 2015197991 A1 | 12/2015 |

OTHER PUBLICATIONS

Written Opinion of the International Searching Authority dated Sep. 26, 2017 for corresponding International Application No. PCT/FR2017/051659, filed Jun. 22, 2017.

Jianbo Cao et al., "A Novel ARQ Protocol for OFDMA Relay System Based on Network Coding", Communication Technology (ICCT), 2010 12th IEEE International Conference on, IEEE, Piscataway, NJ, USA, Nov. 11, 2010 (Nov. 11, 2010), pp. 1047-1051, XP031849652.

Mohamad Abdulaziz et al. "Dynamic Selective Decode and Forward in Wireless Relay Networks", 2015 7th International Congress on Ultra Modern Telecommunications and Control Systems and Workshops (ICUMT), IEEE, Oct. 6, 2015 (Oct. 6, 2015), pp. 189-195, XP032849435.

International Preliminary Report on Patentability and English translation of Written Opinion of the International Searching Authority dated Dec. 25, 2018 for corresponding International Application No. PCT/FR2017/051659, filed Jun. 22, 2017.

* cited by examiner

METHOD FOR TRANSMITTING A DIGITAL SIGNAL FOR A SYSTEM HAVING AT LEAST ONE DYNAMIC HALF-DUPLEX RELAY WITH SELECTIVE LOGIC, CORRESPONDING PROGRAM PRODUCT AND RELAY DEVICE

CROSS-REFERENCE TO RELATED APPLICATIONS

This Application is a Section 371 National Stage Application of International Application No. PCT/FR2017/051659, filed Jun. 22, 2017, which is incorporated by reference in its entirety and published as WO 2017/220937 A1 on Dec. 28, 2017, not in English.

FIELD OF THE INVENTION

The field of the invention is that of the transmission of coded data in a telecommunication system which comprises at least two sources, a relay and a destination. More precisely, the invention pertains to network coding and it relates to the improvement of the quality of data transmission, and in particular the improvement of the performance of the error-correcting decoding in a receiver.

The invention applies especially, but not exclusively, to the transmission of data via mobile networks, for example for real-time applications.

PRIOR ART

Networks, in particular mobile networks, are in search of appreciable gains in terms of capacity, reliability, consumption, etc. The transmission channel of a mobile network is deemed to be difficult and leads to relatively mediocre transmission reliability. Significant advances have been made in recent years, in relation to coding and modulation, especially with regard to considerations in respect of consumption and capacity. Indeed, in a mobile network where several transmitters/receivers share the same resources (time, frequency and space), the transmission power must be reduced to the maximum.

This reduction runs counter to the coverage and therefore to the capacity of the system and more generally to its performance.

To increase coverage, enhance the reliability of communications and more generally to improve performance, one approach consists in relying on relays to increase the spectral efficiency and therefore improve the transmission efficiency and the reliability of systems.

A MARC system is a telecommunication system with at least four nodes comprising at least two sources (senders), a relay and a recipient (receiver). The topology, illustrated by FIG. 1, of MARC systems is such that the sources, nodes $S_1$ and $S_2$, broadcast their coded information sequences for the attention of the relay R and of the recipient D. The relay decodes the received signals arising from the sources $S_1$ and $S_2$ and re-encodes the former jointly while adding inherent redundancy creating a spatially distributed network code. At the destination D, the decoding of the three spatially distributed coded sequences, comprising the two received coded sequences arising directly from the sources S1 and S2 and the coded sequence arising from the relay, rests on joint channel/network decoding algorithms.

Network coding is a form of cooperation according to which the nodes of the network share not only their inherent resources (power, band, etc.) but also their calculation capacity, so as to create a distributed coding which is more and more powerful as the information propagates through the nodes. It brings substantial gains in terms of diversity and coding and therefore of reliability of transmission.

For a MARC system, it is considered that the bitrate bits/s of the sources and of the relay is $D=1/T_s$ and that the total transmission duration available is fixed at T. Thus, the number of channel uses available that can be shared between the sources and the relay is $N=DT$. If one considers the case of the Nyquist bitrate and of transmission of a pulse whose shape is that of a cardinal sine, then N is the total number of available complex dimensions and D is the available total band of the system.

Two types of relay operation are distinguished: the half-duplex mode and the full-duplex mode.

According to the known half-duplex mode, two transmission phases are distinguished, corresponding to different uses of the transmission channel since the relay is incapable of receiving and sending simultaneously. The sources and the relay therefore share the total number of uses of the transmission channel as two successive parts corresponding to the two phases. During the first phase which comprises the $1^{st}$ part of the uses of the transmission channel (time slots), the two sources send but not the relay. The relay decodes/re-encodes jointly so as to deduce the signal to be sent during the next uses of the transmission channel. During the second phase which comprises the $2^{nd}$ part of the uses of the transmission channel, the relay sends the signal determined during the $1^{st}$ part of the uses of the transmission channel and the sources send parity sequences relating to the same items of information as those sent during the $1^{st}$ part of the uses of the transmission channel. The relay therefore complies with a certain timing fixed by the duration of the second phase. Relays of half-duplex type are attractive on account of a simple communication scheme and on account of the ease of implementing them and of their reduced cost which result therefrom.

Patent application WO2012/022905 A1 in the name of the same applicant describes a half-duplex relay which operates according to the previous timing in two phases for a MARC system with non-orthogonal links. The relay implements a relaying method which does not transmit the words decoded with error according to a technique termed SDF Selective Decode and Forward. According to this technique, the relay attempts to decode the messages of the sources and transmits the result of a deterministic function solely of the messages detected without error. This error detection is performed by means of a check of the CRC (Cyclic Redundancy Check) which is included in the source messages. Moreover, each relay includes in its transmission a control signal indicating to the destination and to the other relays, the sources' messages with which it cooperates.

Although the selective relaying technique exhibits undeniable advantages by avoiding error propagation by the relay, its use with a half-duplex relay has the drawback of requiring that the relay and the sources determine and know the respective durations of the two transmission phases.

Patent application WO 2015092302 A1 describes a relaying technique according to which the half-duplex relay operates in a dynamic rather than a fixed manner, it is capable of adapting its manner of operation as a function of the errors in decoding the received messages originating from several sources.

Below a threshold B1 of number of uses of the transmission channel, the relay remains in a mode of non-selective listening. In this mode, the relay attempts to detect and to decode without error the messages of all the sources. As soon as the number of elapsed uses of the channel crosses the threshold B1, the relay passes to a mode of selective listening. In this latter mode, the relay toggles from a listening phase during which it attempts to detect and to decode without error the messages of the sources in a phase of coding and transmission to the recipient as soon as a message is decoded without error. Thus, the relay passes from non-selective listening to selective listening if the elapsed time exceeds the threshold B1 which is a parameter of the system. Thus, the threshold B1 makes it possible not to penalize sources which require a longer decoding time than a source whose source-relay link is markedly better than the source-relay links of the other sources. Thus, the parameterization of the threshold B1 makes it possible to introduce an operating flexibility of the MARC system which allows adaptation of the relay to different environments between the sources. B1 can be variable, for example at each code word of B blocks or as a function of a number of code words; the relay listening time is not fixed. On the one hand this flexibility allows adaptation to an instantaneous variation of quality of the source-relay links. Moreover, in the eventuality that the link between one of the sources and the relay is very bad, the lengthening of the non-selective-listening time may ultimately allow the relay to decode this source and to transmit a signal representative of the messages of all the sources to the destination. Furthermore, even if the decoding of this source cannot be done without error, the relay can nevertheless aid the destination by transmitting a signal representative of the messages decoded without error of the other sources after passing to the mode of selective listening. Moreover, this manner of operation is totally transparent to the sources; only the relay adapts its mode of listening.

Thus, the technique described rests in particular on the distinction of two modes of listening of the relay, a mode of total listening and a mode of selective listening. During the mode of total listening the relay waits to decode without error the messages of all the sources on the basis, for a source, of all or part of the code words received sent by this source before transmitting after coding solely the messages decoded without error. After passing from the mode of total listening to the mode of selective listening, the relay transmits, after coding, the first messages that it has been able to decode without error.

Toggling from a listening phase to a coding and transmission phase therefore occurs in a dynamic rather than a fixed manner. This flexibility in toggling makes it possible to adapt the manner of operation of the relay to the quality of the channel between the sources and the relay, which is not the case if the duration of listening of the relay is fixed with respect to the duration of transmission of the sources. Distinguishing between two listening modes increases the probability of being able to decode without error several sources even when one of the relay source links is of much better quality than the other links.

However, as soon as the relay toggles from the reception phase to the coding and transmission phase, it can no longer correctly decode the as yet undecoded messages of the sources since, as the relay is half-duplex, it cannot listen to the sources and transmit simultaneously. The value of the threshold is therefore sensitive and difficult to determine.

Furthermore, a destination source link can sometimes turn out to be of better quality than the relay source link and allow the destination to correctly decode the message of this source before the relay. During non-selective reception, it may happen that the relay does not toggle to the coding phase only because it does not succeed in correctly decoding a message already correctly decoded by the destination. In this case, the relay expends energy needlessly and does not afford the destination any aid over the time remaining before crossing the threshold B1 whilst it would have been able to cooperate with the destination before this threshold B1. During selective reception, the toggling of the relay subsequent to the correct decoding of a message which turns out to have already been correctly decoded by the destination not only does not afford the destination any gain but furthermore increases the interference at the destination.

Main Characteristics of the Invention

The subject of the invention is a relaying method implemented by a half-duplex relay intended for a telecommunication system comprising several sources, at least the relay and a recipient, comprising:

a parameterization of sets $\mathcal{L}_{R,b}$ of sources indexed by the time b, a definition of logic rules $C_b(\mathcal{L}_{R,b}, \mathcal{S}_{R,b}, \mathcal{S}_{D,b})$, b= 1, . . . , B−1 indexed by the time b which lead to the determination of a selection of messages of sources decoded without error with which the relay cooperates at the time b+1 by taking into account only the set $\mathcal{L}_{R,b}$, a set $\mathcal{S}_{R,b}$ of sources decoded without error by the relay and a set $\mathcal{S}_{D,b}$ of sources decoded without error by the destination, B a natural number, B>2, a reception phase comprising:

the reception of code words sent by the sources corresponding for a source to B blocks, the first block of which can be decoded independently of the other blocks, this phase comprising a decoding step for estimating per source on the basis of code words received a message $u_S$ associated with the code words sent by the source, the error detection and the decision by the relay of the messages decoded without error, the messages decoded without error determining the set $\mathcal{S}_{R,b}$ of the sources decoded without error by the relay, a phase of coding and of transmission to the recipient of a signal representative solely of the selection of the messages.

The reception phase is such that, after each reception of a block from the various sources, the relay receives and decodes a return pathway originating from the destination indicating whether no or at least one message is decoded without error, these messages decoded without error by the destination determining the set $\mathcal{S}_{D,b}$ of sources decoded without error by the destination. And the method is such that the relay toggles from the reception phase to the coding and transmission phase only as soon as one of the logic rules $C_b$ is valid.

The subject of the invention is furthermore a half-duplex relay intended for a telecommunication system comprising several sources, at least the relay and a recipient, for the implementation of a relaying method according to the invention. The relay comprises:

a memory for storing a parameterization of sets $\mathcal{L}_{R,b}$ of sources indexed by the time b and for storing logic rules $C_b$ ($\mathcal{L}_{R,b}, \mathcal{S}_{R,b}, \mathcal{S}_{D,b}$), b=1, . . . , B−1 indexed by the time b which lead to the determination of a selection of messages of sources decoded without error with which the relay cooperates at the time b+1 by taking into account only the set $\mathcal{L}_{R,b}$, a set $\mathcal{S}_{R,b}$ of sources decoded without error by the relay and a set $\mathcal{S}_{D,b}$ of sources decoded without error by the destination, B a natural number, B>2, a means of decoding for estimating per source, on the basis of words received corresponding to code words sent by the sources, the successive code words sent by a source corresponding to B blocks, the first block of which can be decoded independently of the other blocks, a message $u_S$ associated with the code words sent by the source, a decision module for deciding source messages $u_S$ decoded without error on the basis of the estimated messages, at each estimation of a message subsequent to a block received, and determining the set $\mathcal{S}_{R,b}$ of the sources decoded without error by the relay, a network coder of the selection of messages, a sender of a signal representative of the network-coded messages to the destination and of a control signal indicating the selected messages.

The relay is such that the decision means steers the selection of the messages decoded without error as input to the network coder as soon as one of the logic rules $C_b$ is valid, the set $\mathcal{S}_{D,b}$ of the sources decoded without error by the destination being determined by taking into account a return pathway originating from the destination indicating correct or incorrect decoding of one or more messages of the sources, these messages decoded without error by the destination determining the set $\mathcal{S}_{D,b}$ of sources decoded without error by the destination.

Thus, the relay forms part of a telecommunication system which comprises at least two sources, the relay and the destination. The system can comprise more than two sources and several relays.

The sources send T messages in consecutive transmission intervals which may, however, be of variable duration. Each transmission interval is independent, the relays reinitialize their memories at the end of each transmission interval.

The relaying method is such that the coding at the sources is of type with finite incremental redundancy and delivers at each transmission sub-interval $b=1, 2, \ldots, B$ of a current transmission interval a block $c_S^{(b)}$ such that the B successive blocks $\{c_S^{(b)}: 1 \leq b \leq B\}$ form the code word $c_S$, such that the first block can be decoded independently of the other blocks and such that the following blocks are parity bits which add redundancy to the first block.

The relay estimates the received messages originating from the sources and code only a selection of messages detected without error in the form of a representative signal.

The relay being half-duplex, it cannot simultaneously transmit and listen to a return pathway originating from the destination.

If the destination correctly decodes the message of a source, it uploads via a return pathway an indication that the message of the source $S_i$ is or is not correctly decoded. To ensure the causality of the method, the return pathway is multiplexed in time with the transmissions of the sources.

On the basis of the return from the destination, the relay can deduce a set of messages correctly decoded by the destination at the time b.

At the time b, the relay applies the logic rule $C_b$ to the arguments consisting of the set of the messages that it has decoded without error, the set of the messages correctly decoded without error by the destination and the parametrized set $L_{R,b}$ to obtain a set. If the set obtained is not empty the relay toggles from the reception to the network coding of a selection of messages decoded without error. And the relay transmits a representative signal arising from the network coding. Note that the logic rules after toggling are ignored.

Thus, the toggling of the relay from the reception phase to the coding and transmission phase occurs only if the logic rule is complied with.

The relay discards any message of the source i decoded without error by the destination (and if it itself correctly decoded) from its selection of the messages decoded without error to be network coded.

Thus, a relay sends information only on the messages which are not yet correctly decoded by the destination thus optimizing the use of the transmission channel. The relay collaborates only with the messages remaining to be decoded by the destination thereby simplifying the processing on reception by the destination and thereby making it possible to reduce the consumed power required for the network coding and for the network decoding as well as the interference generated within the system and therefore the power required to combat such interference.

Taking into account in the selection by the relay the decisions occurring at the destination makes it possible to ensure that cooperation after toggling is always effective and affords an aid to the destination.

According to one embodiment, the logic rules $C_b$, $b=1, \ldots, B-1$, define sources with which the relay can cooperate in a mode of non-selective reception and sources with which the relay can cooperate in a mode of selective reception.

According to one embodiment, the sets $\mathcal{L}_{R,b}$ are all identical to one and the same set $S_m$ of sources of at most all the sources, in which the logic rules are all identical to a $1^{st}$ rule, this $1^{st}$ rule being valid if on the one hand the set $S_m$ minus the sources associated with the messages correctly decoded by the destination is included or equal to the set of the sources associated with the messages correctly decoded by the relay $(S_m \backslash \mathcal{S}_{D,b}) \subseteq \mathcal{S}_{R,b}$ and if on the other hand the set of the sources associated with the messages correctly decoded by the relay minus the sources associated with the messages correctly decoded by the destination is not empty $\mathcal{S}_{R,b} \backslash \mathcal{S}_{D,b} \neq \emptyset$. Furthermore, after toggling, the relay codes the messages of the sources of the set S minus the sources associated with the messages correctly decoded by the destination.

According to one embodiment, for b≤temporal threshold the sets $\mathcal{L}_{R,b}$ are all identical to one and the same set $S_m$ of sources of at most all the sources $S_m \subseteq S$ and the logic rules are all identical to a $1^{st}$ rule. For b>temporal threshold the sets $\mathcal{L}_{R,b}$ are empty and the logic rules are all identical to a $2^{nd}$ rule. Furthermore, the $1^{st}$ rule is valid if the set $S_m$ minus the sources associated with the messages correctly decoded by the destination is included or equal to the set of the sources associated with the messages correctly decoded by the relay $(Sm \backslash \mathcal{S}_{D,b}) \subseteq \mathcal{S}_{R,b}$ and if the set of the sources associated with the messages correctly decoded by the relay minus the sources associated with the messages correctly decoded by the destination is not empty $\mathcal{S}_{R,b} \backslash \mathcal{S}_{D,b} \neq \emptyset$ and the $2^{nd}$ rule is valid if the set of the sources associated with the messages correctly decoded by the relay minus the sources associated with the messages correctly decoded by the destination is not empty $\mathcal{S}_{R,b} \backslash \mathcal{S}_{D,b} \neq \emptyset$. Furthermore, after toggling, the relay codes the messages correctly decoded by the relay minus the sources associated with the messages correctly decoded by the destination, temporal threshold being a parameter.

According to one embodiment, for b≤temporal threshold the sets $\mathcal{L}_{R,b}$ are all identical to a $1^{st}$ set $\{S_1, S_2\}$ of two sources and the logic rules are all identical to a $1^{st}$ rule. For b>temporal threshold the sets $\mathcal{L}_{R,b}$ are all identical to a $2^{nd}$ set $S_m$ of at most all the sources and the logic rules are all identical to a $2^{nd}$ rule. The $1^{st}$ rule is valid if the intersection between the $1^{st}$ set $\{S_1, S_2\}$ minus the sources associated with the messages correctly decoded by the destination and the set of the sources associated with the messages correctly decoded by the relay is not empty ($\{S_1, S_2\}\backslash \mathcal{S}_{D,b} \cap \mathcal{S}_{R,b} \neq \emptyset$). The $2^{nd}$ rule is valid if the intersection between the $2^{nd}$ set S minus the sources associated with the messages correctly decoded by the destination and the set of the sources associated with the messages correctly decoded by the relay is not empty $S\backslash \mathcal{S}_{D,b} \cap \mathcal{S}_{R,b} \neq \emptyset$. Furthermore, after toggling, the relay codes the messages correctly decoded by the relay minus the sources associated with the messages correctly decoded by the destination.

According to one embodiment, the accumulation of the blocks from 1 to b sent successively by a source is a code word of a code whose rate decreases with b, $1 \leq b \leq B$.

According to one embodiment, the return pathway consists of nominative control signals per source.

According to one embodiment, the method furthermore comprises per source S:
coding into a code word $c_s$ of a message $u_S$ of K bits comprising a CRC, the coding being of type with finite incremental redundancy and delivering a block $c_S^{(b)}$ at each transmission sub-interval b, $1 \leq b \leq B$, such that the B successive blocks $c_S^{(1)}, c_S^{(2)}, \ldots, c_S^{(b)} \ldots, c_S^{(B)}$ form the code word $c_s$, such that the first block can be decoded independently of the other blocks and such that the following blocks are parity bits which add redundancy to the first block,
sending after modulation of the blocks $c_S^{(b)}$ during the B transmission sub-intervals destined for the relay and for the destination.

According to one embodiment, after each sending of a block, a source S does not send during a time period required for receiving and decoding the return pathway originating from the destination indicating correct or incorrect decoding of one or more messages of the sources. Furthermore, the source halts the sending of the blocks if its message $u_S$ is indicated correctly decoded.

According to one embodiment, the sources simultaneously send destined for the same destination thereby making it possible to use the common spectral resource to the maximum. The system is then termed MARC (Multiple-Access Relay Channel) or MAMRC (Multiple-Access Multiple Relays Channel).

According to one embodiment, the relay can furthermore utilize the return signals to act upstream during the detection and decoding of the messages received from the sources and discard those of the sources already decoded without error by the destination.

The various embodiments above may or may not be combined with one or more of these modes to define another embodiment.

The subject of the invention is furthermore a system which comprises at least two sources, the relay and the destination, which is adapted to the implementation of a method according to the invention. Thus, a system according to the invention comprises a relay according to the invention.

According to an example, the system is a MARC system. When the system comprises several relays it is termed MAMRC.

Each of the sources, each of the relays and the destination can be equipped with one or more send antennas and with one or more receive antennas.

According to a preferred implementation, the steps of the relaying method are determined by the instructions of a relaying program incorporated in one or more electronic circuits such as chips itself being able to be disposed in electronic devices of the system. The relaying method according to the invention can equally well be implemented when this program is loaded into a calculation facility such as a processor or equivalent whose operation is then controlled by the execution of the program.

Consequently, the invention also applies to a computer program, especially a computer program on or in an information medium, suitable for implementing the invention. This program can use any programming language and be in the form of source code, object code, or of code intermediate between source code and object code such as in a partially compiled form, or in any other desirable form for implementing a method according to the invention.

The information medium can be any entity or device capable of storing the program. For example, the medium can comprise a storage means, such as a ROM, for example a CD ROM or a microelectronic circuit ROM, or else a magnetic recording means, for example a USB key or a hard disk.

Alternatively, the information medium can be an integrated circuit in which the program is incorporated, the circuit being adapted to execute or to be used in the execution of the method in question.

Moreover, the program can be translated into a transmissible form such as an electrical or optical signal, which can be conveyed via an electrical or optical cable, by radio or by other means. The program according to the invention can in particular be downloaded from a network of Internet type.

LIST OF FIGURES

Figure 2:
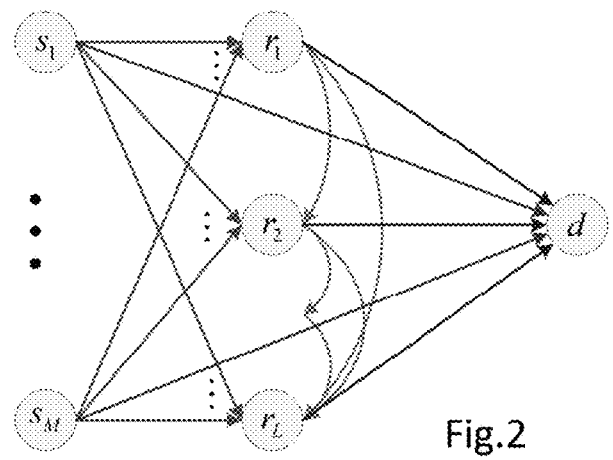
Figure 3:
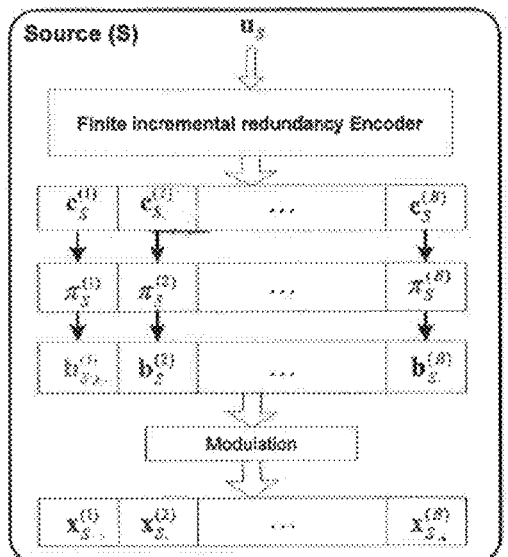
Figure 5:
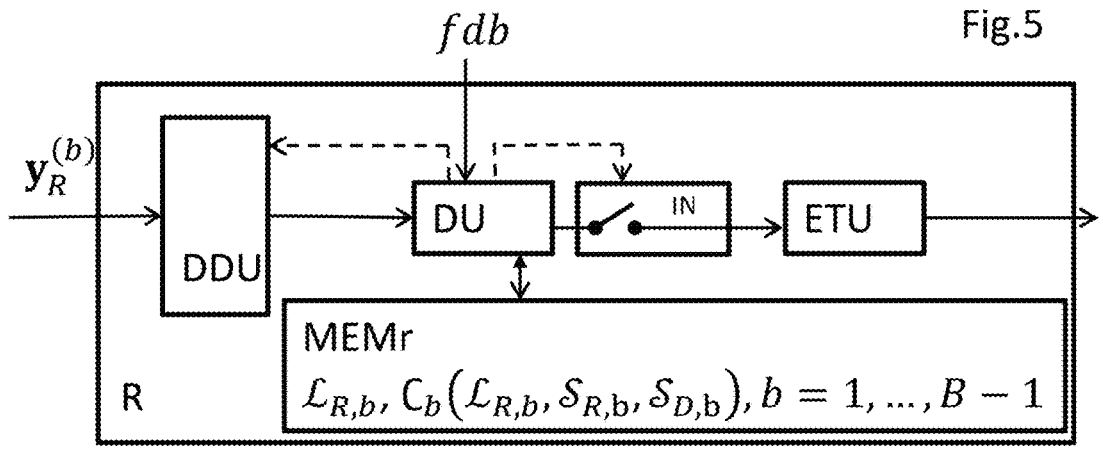
Figure 6:
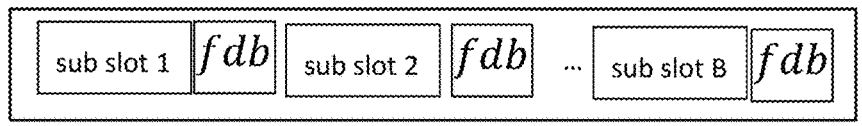
Figure 4:
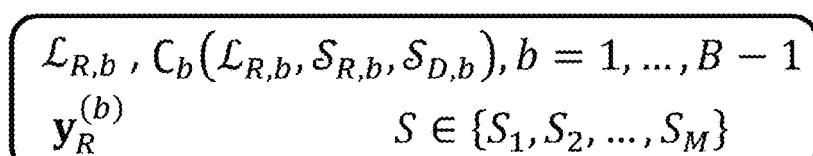
Figure 4:
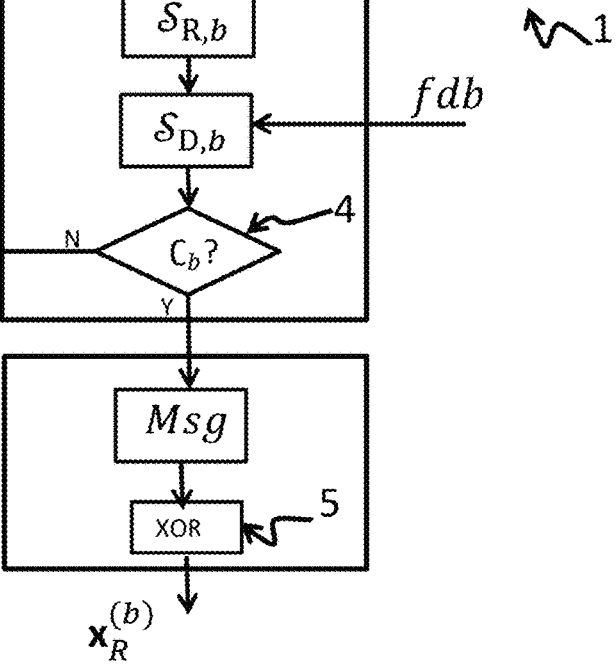
Figure 7:
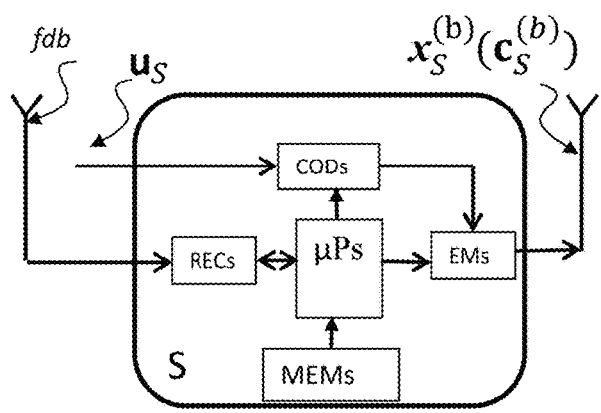
Figure 9:
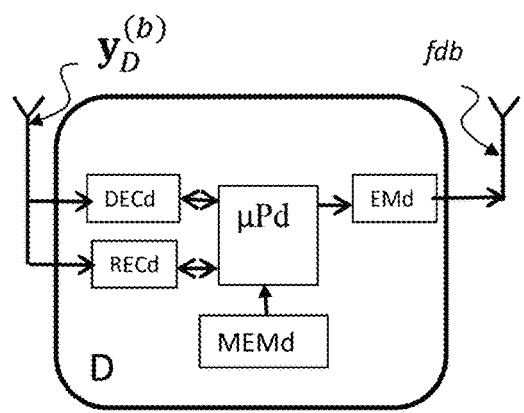
Figure 8:
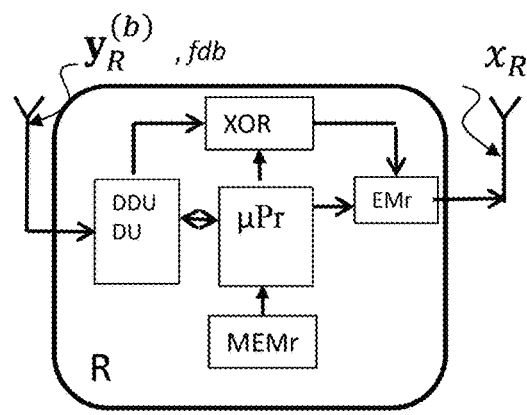

Other characteristics and advantages of the invention will become more clearly apparent on reading the following description of embodiments which are given by way of simple illustrative and nonlimiting examples, and of the appended drawings, among which:

FIG. 1 is a diagram illustrating the basic topology of a MARC system with two sources $S_1$, $S_2$, a relay R and a destination D, FIG. 2 is a diagram illustrating the basic topology of a MAMRC system with M sources $S_1, \ldots, S_M$, L relays $\{R_1, R_2, \ldots, R_L\}$ and a destination D, FIG. 3 is a diagram of an embodiment of the steps of the relaying method which are implemented by a source S according to the invention, FIG. 4 is a flowchart of the method according to the invention implemented by the relay R, FIG. 5 is a diagram of an embodiment of a relay according to the invention, FIG. 6 is a diagram of the time-multiplexing between the transmissions of the sources and of the return pathway, FIG. 7 is a diagram of an exemplary embodiment of a source S according to the invention, FIG. 8 is a diagram of an exemplary embodiment of a relay R according to the invention, FIG. 9 is a diagram of an exemplary embodiment of a recipient device D according to the invention.

DESCRIPTION OF PARTICULAR EMBODIMENTS

The context of the invention is that in which several sources (senders) $S_1, \ldots, S_M$ wish to dispatch their respective messages to a common destination D with the aid of at least one half-duplex relay $\{R_1, R_2, \ldots, R_L\}$ as illustrated by FIG. 2. When there are several relays, each can utilize the signal sent by the other active relays.

There is no constraint on the transmission channel; it can be a fast- or slow-fading channel, it can be frequency selective, and it can be MIMO. In the subsequent description, the nodes (sources, relays and destination) are assumed perfectly synchronized and the sources are independent (there is no correlation between them).

A transmission cycle is decomposed into T transmission intervals (time slots). The duration of a cycle depends on the parameterization of the system and in particular the MAC layer according to the split into seven layers of the ISO. At each transmission interval, each source has a message of K bits to be transmitted. An item of information of CRC type forms part of the message of K bits transmitted by a source and is used to determine whether a message received is correctly decoded. The T messages of a source may be mutually independent or may be correlated and form a frame.

According to the example described, the sources send simultaneously. The relay attempts to transmit to the destination a useful signal representative of the messages estimated and decoded without error so as to aid the communications between the sources and the destination. The relay cooperates with the sources by optionally utilizing in the case of a MAMRC system the signals transmitted by the other active relays before this relay toggles.

$\mathbb{F}_2$ is the Galois field with two elements, R is the field of reals and $\mathbb{C}$ is the field of complex numbers.

FIG. 3 is a diagram of an embodiment of the steps of the relaying method according to the invention which are implemented by the source.

At each transmission interval each source S from among the M sources $\{S_1, S_2, \ldots, S_M\}$ has a message $u_S$ comprising K information bits to be transmitted, $u_S \in \mathbb{F}_2^K$. The message $u_S$ comprises a code of CRC type which makes it possible to verify the integrity of the message $u_S$.

The statistically independent sources $\{S_1, S_2, \ldots, S_M\}$ perform a coding of the message $u_S$ by means of a code with incremental redundancy and transform the message $u_S$ into $n_S$ bits denoted $c_s \in \mathbb{F}_2^{n_S}$. The code word $c_s$ obtained is segmented into B redundancy blocks, each transmitted during a sub-interval, denoted $c_S^{(b)} \in \mathbb{F}_2^{n_{S,b}}$ with $b=1, 2, \ldots, B$. Each block comprises $n_{S,b}$ bits, $n_S = \Sigma_{b=1}^{B} n_{S,b}$. The code with incremental redundancy can be of systematic type, the information bits are then included in the first block: $u_S \in c_S^{(1)}$. Whether the code with incremental redundancy is or is not of systematic type, it is such that the first block $c_S^{(1)}$ from among the B blocks can be decoded independently of the other blocks. The highest coding rate at the source S is $K/n_{S,1}$ and it cannot be larger than one, $n_{S,1} > K$. The minimum coding rate for a source S is $K/n_S$. Each block $\{c_S^{(b)}: 1 < b \leq B\}$ after the first block comprises parity bits which add redundancy to the first block, each of the blocks $\{c_S^{(b)}: 1 < b \leq B\}$ can be decoded jointly with the first block.

The code with incremental redundancy can be produced for example by means of a finite family of punctured linear codes with compatible rates or of rateless codes modified to operate with finite lengths: raptor code (RC), rate compatible punctured turbo code (RCPTC), rate compatible punctured convolutional code (RCPCC), rate compatible LDPC (rate compatible low density check code, RCLDPC).

Each block $c_S^{(b)}$ is interleaved by a distinct interleaver denoted $\pi_S^{(b)}$, the code word after interleaving is denoted $b_S = [b_S^{(1)}, b_S^{(2)}, \ldots, b_S^{(B)}]$. The interleavers make it possible to combat the fadings which can occur during transmission through the channel and make it possible to give each source an imprint which facilitates the separation of the sources by the relay and by the destination. Each interleaved part $b_S^{(b)}$ of the code word is modulated to obtain a complex code word $x_S = [x_S^{(1)}, x_S^{(2)}, \ldots, x_S^{(B)}] \ x_S^{(b)} \in X^{N_b}$, $b=1, 2 \ldots, B$ where $X \subset \mathbb{C}$ designates a complex signal of cardinality $|X| = 2^{q_S}$ and where $N_b = n_{S,b}/q_S$.

Each source S from among the M sources $\{S_1, S_2, \ldots, S_M\}$ can use a minimum coding rate $K/n_S$ and a modulation order $q_S$ which are different from those of the other sources insofar as the numbers of sub-intervals of transmission of the complex code words sent are identical amongst the sources: $n_{S,b}/q_S = N_b$, $b=1, 2, \ldots, B$.

Each source S sends the code word $x_S = [x_S^{(1)}, x_S^{(2)}, \ldots, x_S^{(B)}]$ composed of B blocks during a transmission interval which decomposes into B sub-intervals. Regardless of b, $1 \leq b \leq B$, the concatenation (or accumulation) of the blocks 1 to b is itself a code word since it arises from the incremental redundancy coder.

To simplify the reception structure of the relays and of the destination, the sources described have interleavers, a coder and a modulator which do not vary as a function of the transmission interval but which may equally well be variable.

The invention proposes a new approach to the cooperation of a relay of a MARC or MAMRC system to aid the sources which transmit and thus to obtain an improvement in the spectral efficiency of the transmission while allowing simple and efficient decoding in the receiver of the recipient.

FIG. 4 is a flowchart of an implementation by the half-duplex relay R of the relaying method according to the invention, which relay being intended for a MARC system illustrated by FIG. 1 or a MAMRC system illustrated by FIG. 2. The method 1 comprises a step 2 of detection and of decoding, a step 3 of detecting errors and of decision, a test of validity of the logic rules 4 and a step 5 of coding and of transmission to the recipient of a signal representative solely of the messages decoded without error.

This relay according to the invention is illustrated by FIG. 5. The relay comprises a memory MEMr, a detector and a decoder DDU, a decision module DU and a coder and a sender ETU.

The memory MEMr stores a parameterization of sets $\mathcal{L}_{R,b}$ of sources indexed by the time b and stores logic rules $C_b(\mathcal{L}_{R,b}, \mathcal{S}_{R,b}, \mathcal{S}_{R,b})$, $b=1, \ldots, B-1$ indexed by the time b. These logic rules lead to the determination of a selection of messages of sources decoded without error with which the relay cooperates at the time b+1 by taking into account only the set $\mathcal{L}_{R,b}$, a set $\mathcal{S}_{R,b}$ of sources decoded without error by the relay and a set $\mathcal{S}_{D,b}$ of sources decoded without error by the destination. B is a natural number, B>2.

The structure and the manner of operation of the DDU are similar to those described in patent applications WO 2015197990 and WO 2015197991.

The detector and the decoder DDU periodically deliver an estimated version of the decoded messages of the sources to the module DU. In the case of simultaneous sending on one and the same radio resource, the detection and the decoding 2 by the detector and the decoder DDU are performed jointly and iteratively. This detection and decoding step provides an estimation of the messages on the basis of the words received up to the current sub-interval, b, corresponding to the words sent $[x_S^{(1)}, x_S^{(2)}, \ldots, x_S^{(b)}]$ by each source S from among the M sources $\{S_1, S_2, \ldots, S_M\}$. The detection and decoding step 2 generates an estimated version $\hat{u}_{S_1}, \hat{u}_{S_2}, \ldots, \hat{u}_{S_M}$ of the decoded messages of the sources.

During each transmission interval and for each sub-interval $b \in \{1, \ldots, B\}$, the relay R receives:

$$y_R^{(b)} = \sum_{i=1}^{M} h_{S_i,R} x_{S_i}^{(b)} + \sum_{R_i \in \{R_1,\ldots,R_L\} \backslash R} h_{R_i,R} x_{R_i}^{(b)} 1_{\{J_{R_i}^b \neq \phi\}} + n_R^{(b)}$$

with $h_{S_i,R} \in \mathbb{C}$ the channel gain between the source $S_i$ and the relay $R$, with $h_{R_i,R} \in \mathbb{C}$ the channel gain between the relay $R_i$ and the relay $R$, $S_i \in \{S_1, \ldots, S_M\}$, $R \in \{R_1, \ldots, R_L\}$, $R_i \in \{R_1, \ldots, R_L\} \backslash R$. $n_R^{(b)}$ is an additional noise vector of variance $\sigma^2$. $J_{R_i}^b$ is the set of the sources with which the relay $R_i$ cooperates during the sub-interval b, and $$1_{\{J_{R_i}^b \neq \phi\}}$$

is a function winch indicates whether the relay $R_i$ does or does not cooperate (sends (active) or is silent) during the block b:

$$1_{\{J_{R_i}^b \neq \phi\}} = \begin{cases} 1 & \text{if } J_{R_i}^b \neq \phi \\ 0 & \text{otherwise} \end{cases},$$

with $\phi$ the empty set.

The decoding of the sequence of the other active relays is configured at each transmission sub-interval b according to a signaling information item originating from these other relays indicating whether each of these relays cooperates on this block b, b=1, . . . B (the non-transmission of a relay can also be detected "blind" without signaling) and indicating for which sources each of these relays cooperates. Thus, the relay R can determine for each block which sources are represented in the sequence of each of the other active relays and steer the decoded sequences accordingly in such a way that they are taken into account during the decoding of the messages of the sources represented in the sequence. One possibility for reducing reception complexity is to allocate a specific frequency band per relay (or/and per source).

The DDU uses the current block b, $y_R^{(b)}$, and all the previously received blocks $y_R^{(1)}, y_R^{(2)}, \ldots, y_R^{(b-1)}$ to obtain an estimation of the messages $\hat{u}_{S_1}, \hat{u}_{S_2}, \ldots, \hat{u}_{S_M}$ of the sources.

The decision module DU tests 3 the CRC of the estimated messages provided by the DDU to determine the messages of the sources decoded without error. The module DU thus determines at each sub-interval the set of the messages correctly decoded by the relay $\mathcal{S}_{R,b}$. At each current sub-interval of a current transmission interval step 3 detects the errors in the estimated messages $\hat{u}_{S_1}, \hat{u}_{S_2}, \ldots, \hat{u}_{S_M}$.

According to one embodiment, the detection of errors is performed by utilizing an item of information of CRC type included in the first of the B blocks originating from the sources. On completion of the error detection, it is decided whether an estimated message is or is not decoded without error. The set of the messages correctly decoded by the relay at the current sub-interval b is denoted $\mathcal{S}_{R,b}$.

In the absence of any message decoded without error, no message is selected to participate in the network coding, the relay remains silent.

The decision module DU furthermore takes as input data, the return pathway f db originating from the destination. This return pathway indicates from among the M messages of the M sources those which have been decoded without error by the destination. At each sub-interval, the destination uploads the indication of the messages $u_S$ originating from the sources $S = \{S_1, \ldots, S_M\}$ correctly decoded or not.

The time-multiplexing of the return pathway with the transmission of the sources is illustrated by the diagram of FIG. 6. After sending of a block, each source interrupts its sending pending the return from the destination. This multiplexing ensures that the relay has the return pathway at its disposal subsequent to the block b received by the destination and by the relay during the current sub-interval, b, before optionally toggling so as to code and transmit a signal during the following sub-interval, b+1. As long as it is in the reception phase, the relay listens to the return from the destination. After toggling, either the relay no longer listens to the return pathway or it regularly interrupts itself from transmitting so as to listen to the return pathway from the destination. In the latter case, the relay may stop transmitting and listening if it notes that the sources with which it is cooperating are decoded without error at the destination, doing so in order to minimize the interference generated and the energy expended by the relay.

Thus, the decision module DU selects for the transmission over the following sub-interval, b+1, from among the messages correctly decoded by the DDU at the current sub-interval, b, only those which have not yet been decoded by the destination at the current sub-interval, b, that is to say that the return pathway does not indicate as correctly decoded.

During each current sub-interval, b, b=1, . . . , B, of the current transmission interval of the current cycle, the destination attempts to detect the messages of each source and then attempts to decode the messages that it has not yet decoded correctly.

The sequence received by the destination D during the sub-interval $b \in \{1, 2, \ldots, B\}$ of the current transmission interval is the following:

$$y_D^{(b)} = \sum_{i=1}^{M} h_{S_i,D} x_{S_i}^{(b)} + \sum_{i=1}^{L} h_{R_i,D} x_R^{(b)} 1_{\{J_{R_i}^b \neq \phi\}} + n_D^{(b)}$$

in which $h_{S_i,D} \in \mathbb{C}$ represents the channel gain between the source $S_i$, $S_i \in \{S_1, \ldots, S_M\}$, and the destination D, $h_{R_i,D} \in \mathbb{C}$ represents the channel gain between the relay $R_i$ and the destination D, $R_i \in \{R_1, \ldots, R_L\}$, $n_D^{(b)} \in \mathbb{C}^{N_b}$ is a noise vector and $J_{R_i}^b$ is the set of the sources with which the relay $R_i$ cooperates during the sub-interval b with $$1_{\{J_{R_i}^b \neq \phi\}}$$

is an indicator to indicate whether the relay $R_i$ is or is not silent:

$$1_{\{J_{R_i}^b \neq \phi\}} = \begin{cases} 1 & \text{if } J_{R_i}^b \neq \phi \\ 0 & \text{otherwise} \end{cases}$$

where $\phi$ represents the empty set.

If the destination correctly decodes the message of the source $S \in \{S_1, \ldots, S_M\}$ during the sub-interval b, it uploads a signal fdb during the time reserved for the return pathway indicating that the message of the source S is correctly decoded, as illustrated by FIG. 6. After each sending of a block $c_S^{(b)}$, a source S does not transmit during a time period required for receiving and decoding the return pathway originating from the destination indicating correct or incorrect decoding of the message of this source.

The module DU deduces on the basis of the return pathway the set of the messages correctly decoded $S_{D,b}$ by the destination at the end of the sub-interval b.

The module DU tests the validity 4 at the sub-interval b of the logic rule $C_b$ ($\mathcal{L}_{R,b}$, $S_{R,b}$, $S_{D,b}$), b=1, . . . , B−1 stored in the memory MEMr so as to determine the selection of the messages of the sources decoded without error with which the relay is possibly cooperating at the sub-interval b+1 by taking into account only the set $\mathcal{L}_{R,b}$, the set $S_{R,b}$ of sources decoded without error by the relay and the set $S_{D,b}$ of sources decoded without error by the destination. If the logic rule $C_b$ is valid then the module DU instructs the toggling of the steering means IN.

After toggling of the steering means IN, the coder of the ETU performs a network coding 5 while adding inherent redundancy creating a network code of the messages selected Msg by the module DU so as to generate a signal representative $x_{R,b}$ of these messages. This network coder is for example an exclusive OR of the selected messages. The representative signal is transmitted by the sender of the ETU at the following sub-interval b+1.

The sender of the ETU ensures the transmission of the representative signal to the destination during the relay cooperation phase. The structure and the manner of operation of the ETU are similar to those described in patent applications WO 2015197990 and WO 2015197991.

During this coding and transmission step 5, the relay transmits during the following sub-interval, b+1, a signal representative $x_R^{(b)}$ of solely these messages decoded without error as well as that a signal indicating the selected messages.

According to one embodiment, if the destination has indicated via the return pathway that it had decoded without error all the messages, the module DU instructs the detector of the DDU to stop processing the received signals i.e. the error-detection and decision step prohibits detection and decoding until the end of the current transmission interval. Thus, the error-detection and decision step 3 furthermore controls the detection and decoding step 2.

As soon as the source S receives the signal f db indicating that the destination has correctly decoded the message $u_S$, it can according to one embodiment stop transmitting its message $u_S$. Stated otherwise, the source halts the transmission of the blocks following the block $c_S^{(b)}$ on the basis of which the destination has correctly decoded the message $u_S$.

Furthermore, if the messages $\{u_{S_1}, \ldots, u_{S_M}\}$ of the various sources have all been correctly decoded by the destination then the source passes, according to one embodiment, to the transmission interval following the current transmission interval of the current cycle or to a cycle following the current transmission cycle if the current interval is equal to T.

Even if the messages $\{u_{S_1}, \ldots, u_{S_M}\}$ of the various sources have not all been correctly decoded by the destination, the source passes, according to one embodiment, to the transmission interval following the current transmission interval of the current transmission cycle if the current sub-interval b is equal to B.

According to one embodiment, the sets $\mathcal{L}_{R,b}$ are all identical to one and the same set $S_m$ of sources of at most all the sources: $S_m \subseteq S$. Furthermore, the logic rules $C_b$ ($\mathcal{L}_{R,b}$, $S_{R,b}$, $S_{D,b}$), b=1, . . . , B−1 are all identical to a rule $C_1$. This rule $C_1$ is valid if $S_m \backslash S_{D,b} \subseteq S_{R,b}$ and if $S_{R,b} \backslash S_{D,b} \neq \emptyset$. After toggling, the relay codes the messages of the sources of the set $S_m \backslash S_{D,b}$. Thus this mode makes it possible to configure the collection of sources with which the relay can cooperate. For example, a source is discarded from $S_m$ to take account for example of the disastrous propagation conditions between this source and the relay.

temporal threshold is a parameter, 1<temporal threshold<B.

According to one embodiment, the sets $\mathcal{L}_{R,b}$ are all identical to one and the same set Sm of sources of at most all the sources: $S_m \subseteq S$ for b≤temporal threshold. Furthermore, the logic rules $C_b$ ($\mathcal{L}_{R,b}$, $S_{R,b}$, $S_{D,b}$) are all identical to a $1^{st}$ rule $C_1$ for b≤temporal threshold. Furthermore, for i>temporal threshold the sets $\mathcal{L}_{R,b}$, are empty and the logic rules $C_b$ ($\mathcal{L}_{R,b}$, $S_{R,b}$, $S_{D,b}$) are identical to a $2^{nd}$ rule $C_2$. The $2^{st}$ rule $C_1$ is valid is the set $S_m$ minus the sources associated with the messages correctly decoded by the destination is included or equal to the set of the sources associated with the messages correctly decoded by the relay and if the set of the sources associated with the messages correctly decoded by the relay minus the sources associated with the messages correctly decoded by the destination is not empty: ($S_m$, \$\delta_{D,b}$)$\subseteq S_{R,b}$ and $S_{R,b}\backslash S_{D,b} \neq \emptyset$. The $2^{nd\ rule\ C}_2$ is valid if the set of the sources associated with the messages correctly decoded by the relay minus the sources associated with the messages correctly decoded by the destination is not empty: $S_{R,b}\backslash S_{D,b} \neq \emptyset$. After toggling, the relay codes the messages correctly decoded by the relay minus the messages correctly decoded by the destination: $S_{R,b}\backslash S_{D,b}$.

According to one embodiment, for b≤temporal threshold the sets $\mathcal{L}_{R,b}$ are all identical to a $1^{st}$ set $\{S_1, S_2\}$ of two sources and the logic rules $C_b$ ($\mathcal{L}_{R,b}$, $S_{R,b}$, $S_{D,b}$) are all identical to a $1^{st}$ rule $C_1$. For b>temporal threshold the sets $\mathcal{L}_{R,b}$, are all identical to a $2^{nd}$ set $S_m$ of at most all the sources and the logic rules $C_b$($\mathcal{L}_{R,b}$, $S_{R,b}$, $S_{D,b}$) are all identical to a $2^{nd}$ rule $C_2$. The $1^{st}$ rule $C_1$ is valid if the intersection between the $1^{st}$ set $\{S_1, S_2\}$ minus the sources associated with the messages correctly decoded by the destination and the set of the sources associated with the messages correctly decoded by the relay is not empty: $(\{S_1,S_2\}\backslash S_{D,b}) \cap S_{R,b} \neq \emptyset$. The $2^{nd}$ rule $C_2$ is valid if the intersection between the $2^{nd}$ set $S_m$ minus the sources associated with the messages correctly decoded by the destination and the set of the sources associated with the messages correctly decoded by the relay is not empty: $S_m\backslash S_{D,b} \cap S_{R,b} \neq \emptyset$. After toggling, the relay codes the messages correctly decoded by the relay minus the messages correctly decoded by the destination: $S_{R,b}\backslash S_{D,b}$.

FIG. 7 is a diagram of an embodiment of a source S according to the invention for the implementation of a relaying method according to the invention. The relaying method is implemented by the activation of a specific software application subsequent for example to the activation of an icon with shortcut displayed on the screen of the source.

The source S comprises a coder CODs, a microprocessor μPs, a memory MEMs, a receiver RECs and a sender EMs. The specific software application is stored in the memory MEMs. The execution of this software application by the microprocessor μPs implements:

the coding of messages $u_S$ of K bits comprising a CRC by the coder CODs into code words $c_S$, of type with finite incremental redundancy so as to deliver at each transmission sub-interval b=1, 2, . . . , B of a current transmission interval of a current transmission cycle, a block $c_S^{(b)}$ such that the first block $c_S^{(1)}$ from among the B blocks can be decoded independently of the other blocks and such that each block $\{c_S^{(b)}:1<b\leq B\}$ after the first block comprises parity bits which add redundancy to the first block, each of the blocks $\{c_S^{(b)}: 1<b\leq B\}$ being able to be decoded jointly with the first block, with K and B natural numbers, B>2, the sending by the sender EMs of the blocks of a code word $c_s$ after interleaving of the code word and then modulation to obtain a complex code word $x_S=[x_S^{(1)}, x_S^{(2)}, \ldots, x_S^{(B)}]$ during the current transmission interval destined for the relays and for the destination, the reception by the receiver RECs of a return pathway fdb originating from the destination indicating correct or incorrect decoding of the messages of the sources, the stopping of the sending by the sender of the blocks $x_S^{(b+1)}, \ldots, x_S^{(B)}$ following the block $x_S^{(b)}$ from which the return pathway indicates correct decoding of the message $u_S$ of the source S, the prohibition of any sending by the sender during a time period required for receiving and decoding the return pathway fdb after each sending by the sender of a block $x_S^{(b)}$ ($c_S^{(b)}$).

FIG. 8 is a diagram of an embodiment of a relay R according to the invention able to cooperate with M sources $S_1, \ldots, S_M$ and L−1 relays $R_1, \ldots, R_{L-1}$ and a destination D of a MAMRC system for the implementation of a relaying method according to the invention. The relaying method is implemented by the activation of a specific software application subsequent for example to the activation of an icon with shortcut displayed on the screen of the relay.

The relay R comprises a decoder DDU, a decision module DU, a microprocessor µPr, an XOR network coder, a memory MEM and a sender EMr. The specific software application is stored in the memory MEMr. The execution of this software application by the microprocessor µPr implements:

the detection and the decoding by the DDU on the basis of successive received blocks $y_R^{(b)}$ originating from the sources so as to estimate a message $\hat{u}_S$ per source S, the detection of errors in the estimated messages and the decision of the messages estimated without error by the DU so as to determine the set of the messages correctly decoded by the relay at the current sub-interval b, denoted $\mathcal{S}_{R,b}$, the determination of the set of the messages correctly decoded $\mathcal{S}_{D,b}$ by the destination at the end of the sub-interval b by the module DU on the basis of the return pathway fdb, the test of the validity at the sub-interval b of the logic rule $C_b$ ($\mathcal{L}_{R,b}$, $\mathcal{S}_{R,b}$, $\mathcal{S}_{D,b}$), b=1, ..., B−1 stored in the memory MEMr by the module DU so as to determine the selection of the messages of the sources decoded without error with which the relay is possibly cooperating at the sub-interval b+1, the activation by the module DU of the XOR network coding of a selection Msg of the messages decoded without error so as to generate a representative signal $x_R$, if the logic rule $C_b$ is valid, the transmission by the sender EMr to the destination of the representative signal $x_R$ and of a control signal indicating the selected messages.

The execution of the codes of the program implies that the module DU prohibits the sending by the sender EMr after each reception by the relay of a block $y_R^{(b)}$ ($c_S^{(b)}$) during a time period required for receiving and decoding the return pathway fdb.

FIG. 9 is a diagram of a recipient device D according to the invention able to cooperate with M sources $S_1, \ldots, S_M$ and L relays $R_1, \ldots, R_L$ of a MAMRC system for the implementation of a relaying method according to the invention. During this cooperation, the device D implements a method for receiving messages. The method for receiving messages is implemented by the activation of a specific software application subsequent for example to the activation of an icon with shortcut displayed on the screen of the device.

The device D comprises a receiver RECd, a decoder DECd, a microprocessor µPd, a memory MEMd and a sender EMd. The specific software application is stored in the memory MEMd. The execution of this software application by the microprocessor µPd implements:

the decoding by the decoder DECd of the messages sent by the sources $S_1, \ldots, S_M$ and of the signals sent by the relays so as to obtain estimated messages and to detect errors in the estimated messages, the reception by the receiver RECd of control signals sent by the relays so as to determine for each active relay the collection $S_R$ of the messages for which this relay is cooperating, the sending by the sender EMd of a return message fdb indicating the messages estimated and decoded without error by the device D.

The sources are for example users who seek to transmit messages to a common destination which is for example a base station of a mobile access network. The sources are aided by several relays which can be lightweighted base stations and/or for example one of the sources in the case where the latter is on the path between the sources and the base station. A source can play the role of relay for example on a radio resource that it does not use to transmit these inherent messages. The sources may equally well be base stations which address themselves to the same destination.

According to a particular use, the sources correspond to mobile terminals. According to another use, the sources may correspond to different services accessible from one and the same terminal but in this case, the terminal is equipped with at least two antennas which determine two different propagation channels between the terminal and the relays and between the terminal and the destination.

The invention claimed is:

1. A method for relaying code words sent simultaneously by several sources during a transmission interval of a cycle of T transmissions, such that a code word comprises B blocks of index b the first of which can be decoded independently of the other blocks, a code word coding a message $u_S$, with B and T natural numbers, B>2, T>1 and such that the B blocks are transmitted during B transmission sub-intervals of the transmission interval, implemented by a half-duplex relay intended for a telecommunication system comprising the sources (S={$S_1, \ldots, S_M$}), at least the relay and a recipient, comprising:

a parameterization of sets $\mathcal{L}_{R,b}$ of sources indexed by the index b of blocks, a definition of logic rules $C_b(\mathcal{L}_{R,b}, \mathcal{S}_{R,b}, \mathcal{S}_{D,b})$, b=1, ..., B−1 indexed by the index b of blocks such that the logic rule $C_b$ leads to the determination of a selection of messages of sources decoded without error with which the relay cooperates at the transmission sub-interval following the transmission of the block b by taking into account only the set $\mathcal{L}_{R,b}$, a set $\mathcal{S}_{R,b}$ of sources decoded without error by the relay and a set $\mathcal{S}_{D,b}$ of sources decoded without error by the destination, a reception phase comprising:
- receiving the code words sent by the sources, this phase comprising a decoding act of estimating per source on the basis of the code words received the message $u_S$ associated with the code word ($c_S$) sent by the source,
- error detection and the decision by the relay of the messages decoded without error, the messages decoded without error determining the set $S_{R,b}$ of the sources decoded without error by the relay,
- a phase of coding and of transmission to the recipient of a signal representative solely of the selection of the messages, the reception phase being such that, after each reception of a block ($c_S^{(b)}$) from the various sources, the relay receives and decodes a return pathway originating from the destination indicating ($S_{D,b}$) whether no or at least one message is decoded without error, these messages decoded without error by the destination determining the set $S_{D,b}$ of sources decoded without error by the destination and the method being such that the relay toggles from the reception phase to the coding and transmission phase as soon as one of the logic rules $C_b$ is valid.

2. The method as claimed in claim 1, such that the logic rules $C_b$, b=1, ..., B-1, define sources with which the relay can cooperate in a mode of non-selective reception ($C_1$) and sources with which the relay can cooperate in a mode of selective reception ($C_2$).

3. The method as claimed in claim 1, in which the sets $\mathcal{L}_{R,b}$ are all identical to one and the same set $S_m$ of sources of at most all the sources ($S_m \subseteq S$), in which the logic rules ($C_b(\mathcal{L}_{R,b}, S_{R,b}, S_{D,b})$, b=1, ..., B-1) are all identical to a 1st rule ($C_1$), this 1st rule ($C_1$) being valid if on the one hand the set $S_m$ minus the sources associated with the messages correctly decoded by the destination is included or equal to the set of the sources associated with the messages correctly decoded by the relay (($S_b \backslash S_{D,b}) \subseteq S_{R,b}$) and if on the other hand the set of the sources associated with the messages correctly decoded by the relay minus the sources associated with the messages correctly decoded by the destination is not empty ($S_{R,b} \backslash S_{D,b} \neq \emptyset$) and in which, after toggling, the relay codes the messages of the sources of the set S minus the sources associated with the messages correctly decoded by the destination.

4. The method as claimed in claim 1, in which for b≤temporal threshold the sets $\mathcal{L}_{R,b}$ are all identical to one and the same set $S_m$ of sources of at most all the sources ($S_m \subseteq S$) and the logic rules ($C_b(\mathcal{L}_{R,b}, S_{R,b}, S_{D,b})$) are all identical to a 1st rule ($C_1$), in which for b>temporal threshold the sets $\mathcal{L}_{R,b}$ are empty and the logic rules ($C_b(\mathcal{L}_{R,b}, S_{R,b}, S_{D,b})$) are all identical to a 2nd rule ($C_2$), the 1st rule ($C_1$) being valid if the set $S_m$ minus the sources associated with the messages correctly decoded by the destination is included or equal to the set of the sources associated with the messages correctly decoded by the relay (($Sm \backslash S_{D,b}) \subseteq S_{R,b}$) and if the set of the sources associated with the messages correctly decoded by the relay minus the sources associated with the messages correctly decoded by the destination is not empty ($S_{R,b} \backslash S_{D,b} \neq \emptyset$), the 2nd rule ($C_2$) being valid if the set of the sources associated with the messages correctly decoded by the relay minus the sources associated with the messages correctly decoded by the destination is not empty ($S_{R,b} \backslash S_{D,b} \neq \emptyset$), and in which, after toggling, the relay codes the messages correctly decoded by the relay minus the sources associated with the messages correctly decoded by the destination, temporal threshold being a parameter.

5. The method as claimed in claim 1, in which for b≤temporal threshold the sets $\mathcal{L}_{R,b}$ are all identical to a 1st set $\{S_1, S_2\}$ of two sources and the logic rules ($C_b(\mathcal{L}_{R,b}, S_{R,b}, S_{D,b})$) are all identical to a 1st rule ($C_1$), in which for b>temporal threshold the sets $\mathcal{L}_{R,b}$ are all identical to a 2nd set $S_m$ of at most all the sources and the logic rules ($C_b(\mathcal{L}_{R,b}, S_{R,b}, S_{D,b})$) are all identical to a 2nd rule ($C_2$), the 1st rule ($C_1$) being valid if the intersection between the 1st set $\{S_1, S_2\}$ minus the sources associated with the messages correctly decoded by the destination and the set of the sources associated with the messages correctly decoded by the relay is not empty ((($\{S_i, S_2\} \backslash S_{D,b}) \cap S_{R,b} \neq \emptyset$), the 2nd rule ($C_2$) being valid if the intersection between the 2nd set S minus the sources associated with the messages correctly decoded by the destination and the set of the sources associated with the messages correctly decoded by the relay is not empty ($S \backslash S_{D,b} \cap S_{R,b} \neq \emptyset$), and in which, after toggling, the relay codes the messages correctly decoded by the relay minus the sources associated with the messages correctly decoded by the destination, temporal threshold being a parameter.

6. The method as claimed in claim 1, in which the accumulation of the blocks from 1 to b sent successively by a source is a code word of a code whose rate decreases with b, 1≤b≤B.

7. The method as claimed in claim 1, in which the return pathway comprises nominative control signals per source.

8. The method as claimed in claim 1, comprising per source S:
- coding into a code word $c_S$ of a message $u_S$ of K bits comprising a CRC, the coding being of type with finite incremental redundancy and delivering a block $c_S^{(b)}$ at each transmission sub-interval b, 1≤b≤B, such that the B successive blocks $c_S^{(1)}, c_S^{(2)}, \ldots c_S^{(b)} \ldots, c_S^{(B)}$ form the code word $c_S$, such that the first block can be decoded independently of the other blocks and such that the following blocks are parity bits which add redundancy to the first block,
- sending after modulation of the blocks $c_S^{(b)}$ during the B transmission sub-intervals destined for the relay and for the destination.

9. The method relaying as claimed in claim 1, in which after each sending of a block ($c_S^{(b)}$), a source S does not send during a time period required for receiving and decoding the return pathway originating from the destination indicating correct or incorrect decoding of one or more messages of the sources and in which the source halts the sending of the blocks if its message $u_S$ is indicated correctly decoded.

10. A half-duplex relay of a telecommunication system comprising several sources ($S=\{S_1, \ldots, S_M\}$), at least the relay and a recipient, the half-duplex relay comprising:
- a processor; and
- a non-transitory computer-readable medium comprising instructions stored thereon which when executed by the processor configure the half-duplex relay to relay code words sent simultaneously by several sources during a transmission interval of a cycle of T transmissions, such that a code word comprises B blocks of index b the first of which can be decoded independently of the other blocks, a code word coding a message $u_S$, with B and T natural numbers, B>2, T>1 and such that the B blocks are transmitted during B transmission sub-intervals of the transmission interval, wherein relaying comprises:
  - a parameterization of sets $\mathcal{L}_{R,b}$ of sources indexed by the index b of blocks,
  - a definition of logic rules $C_b(\mathcal{L}_{R,b}, S_{R,b}, S_{D,b})$, b=1, ..., B-1 indexed by the index b of blocks such that the logic rule $C_b$ leads to the determination of a selection of messages of sources decoded without error with which the relay cooperates at the transmission sub-interval following the transmission of the block b by taking into account only the set $\mathcal{L}_{R,b}$, a set $\mathcal{S}_{R,b}$ of sources decoded without error by the relay and a set $\mathcal{S}_{D,b}$ of sources decoded without error by the destination, a reception phase comprising:
receiving the code words sent by the sources, this phase comprising a decoding act of estimating per source on the basis of the code words received the message $u_S$ associated with the code word ($c_S$) sent by the source,
error detection and the decision by the relay of the messages decoded without error, the messages decoded without error determining the set $\mathcal{S}_{R,b}$ of the sources decoded without error by the relay,
a phase of coding and of transmission to the recipient of a signal representative solely of the selection of the messages, the reception phase being such that, after each reception of a block ($c_S^{(b)}$) from the various sources, the relay receives and decodes a return pathway originating from the destination indicating ($\mathcal{S}_{D,b}$) whether no or at least one message is decoded without error, these messages decoded without error by the destination determining the set $\mathcal{S}_{D,b}$ of sources decoded without error by the destination and the method being such that the relay toggles from the reception phase to the coding and transmission phase as soon as one of the logic rules $C_b$ is valid.

11. A non-transitory computer-readable information medium comprising program instructions stored thereon for implementing a method of relaying a digital signal, when said program is loaded and executed in a relay of a telecommunication system comprising several sources (S= $\{S_1, \ldots, S_M\}$), at least the relay and a recipient, wherein the method comprises:
relaying code words sent simultaneously by several sources during a transmission interval of a cycle of T transmissions, such that a code word comprises B blocks of index b the first of which can be decoded independently of the other blocks, a code word coding a message $u_S$, with B and T natural numbers, B>2, T>1 and such that the B blocks are transmitted during B transmission sub-intervals of the transmission interval, wherein relaying comprises:
a parameterization of sets $\mathcal{L}_{R,b}$ of sources indexed by the index b of blocks,
a definition of logic rules $C_b(\mathcal{L}_{R,b}, \mathcal{S}_{R,b}, \mathcal{S}_{D,b})$, b=1, ..., B−1 indexed by the index b of blocks such that the logic rule $C_b$ leads to the determination of a selection of messages of sources decoded without error with which the relay cooperates at the transmission sub-interval following the transmission of the block b by taking into account only the set $\mathcal{L}_{R,b}$, a set $\mathcal{S}_{R,b}$ of sources decoded without error by the relay and a set $\mathcal{S}_{D,b}$ of sources decoded without error by the destination,
a reception phase comprising:
receiving the code words sent by the sources, this phase comprising a decoding act of estimating per source on the basis of the code words received the message $u_S$ associated with the code word ($c_S$) sent by the source,
error detection and the decision by the relay of the messages decoded without error, the messages decoded without error determining the set $\mathcal{S}_{R,b}$ of the sources decoded without error by the relay,
a phase of coding and of transmission to the recipient of a signal representative solely of the selection of the messages,
the reception phase being such that, after each reception of a block ($c_S^{(b)}$) from the various sources, the relay receives and decodes a return pathway originating from the destination indicating ($\mathcal{S}_{D,b}$) whether no or at least one message is decoded without error, these messages decoded without error by the destination determining the set $\mathcal{S}_{D,b}$ of sources decoded without error by the destination and the method being such that the relay toggles from the reception phase to the coding and transmission phase as soon as one of the logic rules $C_b$ is valid.

* * * * *